May 5, 1964  L. M. SANDERS  3,131,715
HYDRAULIC BRAKING ACCESSORY
Filed June 8, 1962
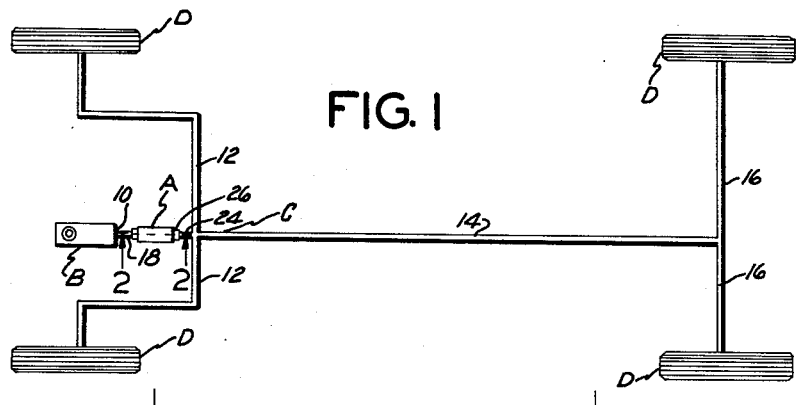
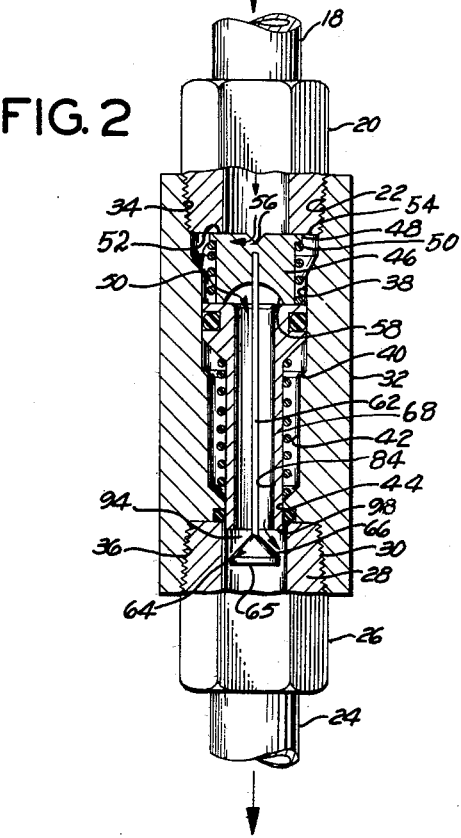
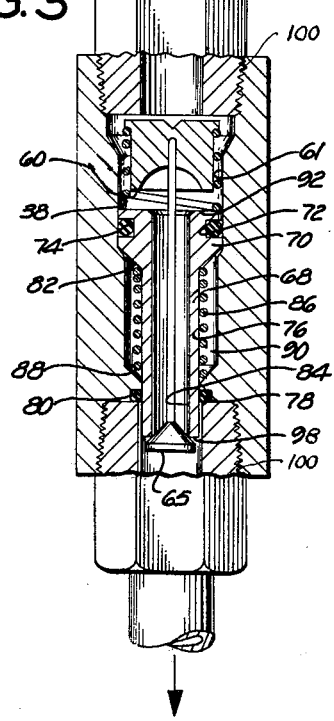
INVENTOR.
LAWRENCE M. SANDERS
BY
ATTORNEY United States Patent Office 3,131,715
Patented May 5, 1964

3,131,715
HYDRAULIC BRAKING ACCESSORY
Lawrence M. Sanders, 13953 S. Paramount Blvd., Paramount, Calif.
Filed June 8, 1962, Ser. No. 201,093
6 Claims. (Cl. 137—493)

The present invention relates generally to the field of hydraulic devices, and more specifically to a pressure regulating valve that permits maintenance of as high a pressure as can be exerted on a hydraulic system without diminution for an indefinite period of time.

The present application is a continuation-in-part of my co-pending application Serial No. 68,465, entitled Hydraulic Brake System and Components Thereof which was filed November 10, 1960.

In what is known as a "panic" stop of an automotive vehicle equipped with hydraulic brakes, it is possible to momentarily apply a high pressure to the brake system due to the greater than normal kinetic energy applied to the brake pedal, but normally this pressure cannot be held for any sustained period of time. As a result, the driver "pumps" the brake pedal to effect braking of the vehicle. Such pumping action applies hydraulic pressure at a high magnitude to the brake system at spaced intervals. Obviously, braking of a vehicle by applying high magnitude hydraulic pressure in spaced intervals, each of a short duration, is not as effective as continuously applying the same high pressure to the system for as long a period as may be necessary.

A primary object in devising the present invention is to provide a hydraulic braking accessory that permits application and continuous maintenance of as high a hydraulic pressure as possible on a brake system without difficulty for an indefinite period of time.

Another object of the invention is to not only permit a high hydraulic pressure to be maintained on a system, but to give the user of such a system the feel of a hard pedal when the brakes are applied.

Yet another object of the invention is to provide means by which it is possible to hold a hydraulic surge in a hydraulic brake system at the peak value without the use of additional equipment.

These and other objects and advantages of the present invention will become apparent from the following description of a preferred form thereof, and from the accompanying drawing illustrating the same, in which:

FIGURE 1 is a schematic top plan view of a vehicle showing the positioning of the valve of the present invention between the master cylinder and the hydraulic brake system;

FIGURE 2 is a longitudinal cross-sectional view of the valve taken on line 2—2 of FIGURE 1 showing a first position which it occupies as hydraulic fluid starts discharging from the master cylinder to the brake cylinders; and FIGURE 3 is a longitudinal cross-sectional view of the valve also taken on line 2—2 of FIGURE 1, but in a second position which it occupies after full pressure has been applied to the brake cylinders.

With continued reference to the drawing for the general arrangement of the invention, it will be seen that the valve A is disposed between the discharge 10 of a master cylinder B and the inlet to a hydraulic braking system C. The system C is conventional and includes a number of conduits 12, 14 and 16 that lead to the wheel supports and brake cylinders (not shown) for the wheels D.

A tube 18 is connected to the discharge 10, and a first male fitting 20 is provided on its rear end. The rear portion of fitting 20 tapers inwardly, and threads 22 are formed thereon. A tube 24 connects the braking accessory to the hydraulic system C. A second male fitting 26 is mounted on the forward end of tube 24, and this fitting has a forward, inwardly tapering portion 28 on which threads 30 are formed.

The hydraulic braking accessory A comprises an elongate body 32, in the forward and rear ends of which tapped tapered recesses 34 and 36 respectively are formed thereof. Recess 34 is engaged by threads 22 of fitting 20, and recess 36 by threads 30 of fitting 26. Recess 34 is in communication with a longitudinally extending bore 38, the rear end of which develops into a rearwardly and inwardly tapered body shoulder 40. The body shoulder 40 develops into a longitudinally extending bore extension 42, and a longitudinally extending counterbore 44 is formed in body 32 which connects extension 42 to recess 36.

A plug 46 that is sensitive to the rate of flow of passing hydraulic fluid is disposed in bore 38. Plug 46 has a circumferentially extending lip 48 formed on the forward end thereof, and a light, compressed helical spring 50 is also positioned in bore 38, the forward end of which bears against the rear face of lip 48. The spring 50, as may be seen in FIGURE 2, normally tends to maintain the forward face 52 of plug 46 in abutting contact with the rear end 54 of fitting 20. Plug 46 is substantially smaller in transverse cross section than the transverse cross section of bore 38.

A transverse groove 56 is formed on the forward face 52 of plug 46, and a second transverse groove 58 is formed on the rear face 60 thereof. The exterior side surface of plug 46 and the interior surface of bore 38 cooperatively define a longitudinally extending annulus-shaped space 61 therebetween.

A stem 62 projects rearwardly from plug 46, and a first valve member 64 is mounted on the rear end of this stem. Valve member 64 has a forwardly and inwardly tapered face 66, and this valve member is disposed in counterbore 44. Valve member 64 is of substantially lesser transverse cross section than counterbore 44, and preferably terminates in a flat transverse rear face 65.

A second valve member 68 is provided that comprises a forward portion 70 that is slidably mounted in bore 38. A circumferentially extending recess 72 is formed in the exterior surface of portion 70. An O-ring which is not adversely affected by the action of hydraulic brake fluid is mounted in recess 72. O-ring 74 slidably and sealingly engages the surface defining bore 38.

Valve member 68 includes a tubular rear portion 76 that extends through bore extension 42 into counterbore 44, and snugly and slidably engages the latter. The surface defining counterbore 44 has a circumferentially extending groove 78 formed therein in which an O-ring 80 is disposed that is formed of an elastomeric material which is impervious to hydraulic brake fluid. O-ring 80 is in sliding sealing contact with the exterior surface of the rear portion 76. The second valve member 68 is preferably formed as an intergal unit. A circumferentially extending rearwardly and inwardly tapering body shoulder 82 is formed at the junction of the forward and rear portions 70 and 76 respectively. A bore 84 extends longitudinally through the forward and rear portions 70 and 76.

A helical spring 86 encircles the rear portion 76 of second valve member 68, and the forward end of this spring abuts against the inner part of body shoulder 82. The lower end of spring 86 abuts against a body shoulder 88 that is formed at the junction of bore extension 42 and counterbore 44. The exterior surface of the rear portion 76, the surface defining bore extension 42, and body shoulders 82 and 88 cooperatively define an air pocket 90. Spring 86 is under compression, and is of such structure as to exert a greater forward force on the second valve member 68 than does spring 50 in a rearward direction. Also, the air in pocket 90 is compressed when member 68 moves from the position shown in FIGURE 2 to that illustrated in FIGURE 3. The compressed air in pocket 90 augments the force exerted by spring 86 in tending at all times to move valve member 68 to the position shown in FIGURE 2. Should it be desired, the compressed air in pocket 90 could be used as the sole source of power to move member 68 from the position shown in FIGURE 3 to that shown in FIGURE 2 to thereby eliminate the spring 86. However, for certainty of operation and to minimize maintenance expense, it is at the present time preferable to use both spring 86 and the compressed air in pocket 90 to move the second valve member 68 from the position shown in FIGURE 3 to that illustrated in FIGURE 2.

The combined area of faces 92 and 66 is much larger, approximately twice the size, of the combined area of faces 65 and 98. Prior to actuation of the master cylinder B when a brake pedal (not shown) is depressed, the hydraulic fluid in the master cylinder and the system C is substantially equal to atmospheric pressure, as is the air in pocket 90. When cylinder B is actuated, the pressure on the hydraulic fluid therein is increased, as is the fluid in the system C. The fluid then under pressure exerts a rearwardly directed force on the face 92 and also exerts a forwardly directed force on the face 98. As illustrated in FIGURE 2, the face 92 is of substantially greater area than face 98 whereby the air in pocket 90, together with the spring 86 is compressed, and the second valve member 68 moves rearwardly from the first position shown in FIGURE 2 to the second position seen in FIGURE 3. As the valve member 68 is moved rearwardly in the manner described, the first valve member 64 is contacted by the rear extremity of member 68 and tends to move the plug 46 rearwardly. However, so long as fluid is flowing rearwardly through the bore 84, this fluid flow will maintain a passage between face 66 of first valve member 64 and the rear extremity of the second valve member 68. As soon as this rearward flow of fluid stops, the spring 50 which is at all times under compression will expand and move the plug 46 forwardly to the position shown in FIGURE 3, with the face 66 of first valve member 64 being brought into sealing contact with the rear extremity of the second valve member 68.

After the first valve member 64 has sealed with the rear extremity of the second valve member 68, the hydraulic fluid in the master cylinder B then exerts a force on the area defined by the faces 92 and 66 of first valve member 64. The fluid in system C situated rearwardly of valve member 64 thereafter exerts a forwardly directed force on the faces 65 and 98. Due to the differential in surface areas between the combined area including the faces 92 and 66 versus the combined areas of the faces 65 and 98, the present invention permits maintenance of the brake pedal (not shown) in a downwardly disposed braking position when the fluid in system C is under a pressure substantially greater than that in the master cylinder B.

In the case of a panic stop, the brake pedal (not shown) may be moved downwardly abruptly with the maximum force it is possible for the driver of the vehicle to exert, whereby the fluid flows rearwardly through the braking accessory of the present invention to the system C to momentarily build up a high fluid pressure therein. Without the invention installed on the vehicle, the driver would normally be unable to maintain this pressure on the fluid in the system C. However, when the invention is utilized, the fluid flows rearwardly therethrough to the system C, with the first valve member 64 and second valve member 68 moving from the position shown in FIGURE 2 to that shown in FIGURE 3.

This fluid is held in the system C at high pressure due to the differential in areas mentioned herein and without any physical discomfort on the part of the driver. When the brake pedal is released, the pressure on the fluid in the master cylinder B decreases, and the high pressure on fluid in the system C exerts a force on the face 98 that is sufficient to cause the second valve member 68 to move forwardly until it assumes the position shown in FIGURE 2.

As the second valve member 68 so moves forwardly, a passage is created between the faces 66 and 98 through which fluid that previously was under high pressure in the system C can flow forwardly to the master cylinder B until the pressure in the master cylinder equalizes with that in system C. This forward movement of the second valve member 68 is assisted by the compressed spring 86, as well as the compression of the air in pocket 90. Upon the next braking operation the braking accessory repeats the cycle of operation just described.

To assure a fluid-tight seal, it has been found desirable to insert Teflon seal tape 100 between the threads 22 and the tapped recess 34 as well as between the threads 30 and the tapped recess 36. Teflon is a trademark used by E. I. du Pont de Nemours and Company of Wilmington, Delaware, to identify a tertafluorethylene polymer product of their manufacture.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claims.

I claim:

1. A pressure control valve for holding the pressure on hydraulic fluid in an automotive brake system which includes a master cylinder at a first pressure that is greater than a second pressure that is thereafter maintained in said master cylinder including:

(*a*) a rigid elongate body in which forwardly and rearwardly disposed openings are formed, a longitudinal bore extending rearwardly from said forward opening, a bore extension extending rearwardly from said bore and in communication therewith, a counterbore extending forwardly from said rear opening and in communication with said extension, a first shoulder formed at the junction of said bore and bore extension, a second shoulder formed at the junction of said bore extension and counterbore, with said bore being of greater transverse cross section than said bore extension, and said bore extension being of greater transverse cross section than said counterbore;

(*b*) first and second tubular fluid conducting means connected to said forwardly and rearwardly disposed openings, with said first tubular means capable of receiving fluid under a first pressure, and said second tubular means capable of receiving said fluid under said first pressure;

(*c*) a movable plug of smaller transverse cross section than said bore that is disposed therein;

(*d*) first resilient means for holding said plug in a first forwardly disposed position;

(*e*) a second valve member that includes a forward portion and a rear tubular portion, which valve member has a bore extending longitudinally therethrough, with said forward portion having a forward face that is substantially greater in area than a rear face of said rear tubular portion;

(*f*) a stem extending rearwardly from said plug through said bore in said second valve member;

(*g*) second means for resiliently holding said second valve member in abutting contact with said plug;

(*h*) a first valve member having a forward face and a rear face, which first valve member is mounted on the rear end of said stem, with said forward face and the rear extremity of said second valve member defining a fluid passage therebetween through which fluid can flow from said first tubular means to said second tubular means when said first and second valve members are at maximum forward positions in said elongate body, with said second valve member moving rearwardly in said body to a second position when said fluid under said first pressure in said first tubular means is increased and said first valve member also moving rearwardly to maintain said passage, with said first resilient means moving said plug, stem and first valve member in a direction relative to said second valve member to dispose said forward face of said first valve member into sealing contact with said rear extremity of said second valve member after flow of fluid from said first tubular means to said second tubular means ceases, and said fluid at a lower pressure in said first tubular means thereafter holding fluid at a higher pressure in said second tubular means due to the differential in areas between the forward faces of said first and second valve members and the rear faces thereof, with said second means moving said second valve member forwardly in said body to re-establish said passage to permit equalization of pressure on said fluid in said first tubular means and second tubular means after the pressure on said fluid in said first tubular means is allowed to decrease below said first pressure; and (i) fluid passage means in said plug that at all times maintain communication between said first tubular means and said bore in said second valve member.

2. A device as defined in claim 1 which further includes a lip that projects from said plug, and said first resilient means comprises a first helical spring which encircles said plug and has a first end abutting against said lip and a second end that abuts against the forward end of said second valve member.

3. A device as defined in claim 2 wherein said second resilient means is a second helical spring that encircles at least a part of said second valve member, with the forward end of said second helical spring abutting against a shoulder formed on said second valve member at the junction of said forward and rearward portions thereof, and with the rear end of said second spring abutting against said second shoulder.

4. A device as defined in claim 2 wherein said second valve member has a body shoulder formed at the junction of said forward and rearward portions, with said shoulder on said second valve member being capable of engaging said first body shoulder to limit the rearward movement of said second valve member in said body.

5. A device as defined in claim 2 wherein said forward portion of said second valve member has a circumferentially extending first groove formed therein, and in addition an O-ring formed of an elastomeric material that is disposed in said first groove, with said ring at all times being in slidable and sealing contact with the surface of said body defining said bore.

6. A device as defined in claim 5 wherein the surface of said body defining said counterbore has a circumferentially extending groove formed therein, and in addition a second O-ring formed of an elastomeric material that is disposed in said second groove which at all times is in sliding and sealing contact with said rear portion of said second valve member.

References Cited in the file of this patent
UNITED STATES PATENTS

| | | |
|---|---|---|
| 2,835,271 | Oberthur | May 20, 1958 |
| 2,861,589 | Ostwald | Nov. 25, 1958 |
| 2,991,797 | Baldwin | July 11, 1961 |